US010467792B1

(12) United States Patent
Roche et al.

(10) Patent No.: US 10,467,792 B1
(45) Date of Patent: Nov. 5, 2019

(54) SIMULATING COMMUNICATION EXPRESSIONS USING VIRTUAL OBJECTS

(71) Applicant: Amazon Technologies, Inc., Seattle, WA (US)

(72) Inventors: Kyle Michael Roche, Mercer Island, WA (US); David Chiapperino, Seattle, WA (US); Vasily Vasinov, Superior, CO (US)

(73) Assignee: Amazon Technologies, Inc., Seattle, WA (US)

( * ) Notice: Subject to any disclaimer, the term of this patent is extended or adjusted under 35 U.S.C. 154(b) by 19 days.

(21) Appl. No.: 15/685,899

(22) Filed: Aug. 24, 2017

(51) Int. Cl.
| G06T 13/20 | (2011.01) |
| G10L 25/57 | (2013.01) |
| G10L 25/63 | (2013.01) |
| G10L 15/22 | (2006.01) |

(52) U.S. Cl.
CPC ............ *G06T 13/205* (2013.01); *G10L 15/22* (2013.01); *G10L 25/57* (2013.01); *G10L 25/63* (2013.01)

(58) Field of Classification Search
None
See application file for complete search history.

(56) References Cited

U.S. PATENT DOCUMENTS

| 9,460,541 | B2 * | 10/2016 | Li ........................... H04N 7/157 |
| 2002/0024519 | A1 * | 2/2002 | Park ........................ G06T 13/40 |
| | | | 345/474 |

* cited by examiner

*Primary Examiner* — Said Broome
(74) *Attorney, Agent, or Firm* — Thorpe North & Western, LLP.

(57) ABSTRACT

A technology is described for simulating communication expressions detected in speech data using virtual objects. An example method may include receiving speech data for a virtual object configured to simulate communication expressions provided by the speech data. The speech data may be analyzed for an indicator of a communication expression and communication mark data that includes an expression tag representing the communication expression may be generated. The speech data and the communication mark data may be transmitted to a simulation client to enable synchronization of an animated expression for the virtual object with the speech data using the expression tag in the communication mark data.

19 Claims, 8 Drawing Sheets

SIMULATING COMMUNICATION EXPRESSIONS USING VIRTUAL OBJECTS

BACKGROUND

Computing devices have become commonplace and are used for a wide variety of purposes. Every day, people use computing devices to view, access, and/or interact with various types of electronic content and information, especially as computing devices and applications are growing in number and in function. As an example of the increased use of computing devices and related functionality, an increasing number of applications are attempting to provide a virtual reality (VR), augmented reality (AR), mixed reality, or three-dimensional graphical experience.

Virtual reality and augmented reality enable interaction among users and between users and virtual objects (e.g., computer controlled avatars) within a virtual reality environment. For virtual reality and augmented reality environments, interactions with the environment and users accessing the environment may include electronic input (e.g., text, pointer devices), verbal input (e.g., speech recognition), and physical input (e.g., motion sensitive controls) relating to the manipulation of physical objects, and so forth. Virtual objects may be configured to respond to these interactions. For example, the appearance, location, dialog presented, and other attributes of a virtual object can be changed based in part on user interactions.

Increasingly, virtual objects in virtual reality and augmented reality environments are used as communication tools. As one example, autonomous interactive virtual objects (e.g., bots, chatbots, talkbots, etc.) can conduct a conversation with a human that simulates a human conversational partner.

DETAILED DESCRIPTION

A technology is described for simulating communication expressions detected in written speech, recorded speech, or recorded audio (e.g., music) by using virtual objects (e.g., avatars) to present the communication expressions. Also, communication expressions associated with personality types can be simulated using the virtual objects, avatars, simulated characters, or human representations. Human communication may involve both verbal or spoken, and nonverbal or unspoken communication expressions to convey a message. For example, in conversation, humans can use communication expressions, such as facial motion, eye movement, hand gestures, and other bodily movement to emphasize or modify what is said, punctuate the flow of dialog, or to convey complex intentions. These communication expressions are an important part of communication and the technology described herein can be used to detect these communication expressions in speech and animate a virtual object, avatar, or human representation to simulate the communication expressions.

A virtual object may include an interactive graphical entity such as an avatar, chatbot, human representation, simulated character, simulated animal, or the like, which may be configured to simulate a human conversation or human presentation that includes verbal and visual expressions detected in speech data. The speech data may be audio data of a human speaking or text data that may be converted to human speech. For example, a virtual object may be animated to simulate speaking (e.g., lip synching) of audio or textual output and show communication expressions that are identified in the audio or textual output. In one example of the technology, speech data to be sent to a virtual object may be analyzed for words, phrases, patterns, phrases, language context, and the like that correlate to communication expressions. Communication mark data may be generated for communication expressions identified in the speech data. The communication mark data may represent animation instructions for animating a face or body of the virtual object. For example, communication mark data may include expression tags or annotations (e.g., text annotations, machine code annotations, etc.) that represent communication expressions detected in speech data. The speech data and the communication mark data may be provided to a simulation client which is capable of producing VR or AR output (e.g., using a VR or AR headset or compatible computing device), and the simulation client may use the speech data and the communication mark data to animate the virtual object to simulate a conversation or presentation that includes communication expressions.

The technology may be used in near real-time to identify communication expressions in the speech of a user, such as virtual reality users, and animate the user's virtual object (e.g. avatar) to simulate the communication expressions. In one example, a user's speech data may be asynchronously analyzed for communication expressions due to an amount of processing that may be needed to perform the processing. "Asynchronous" means that speech data is analyzed when the speech data is received or obtained and the results of the analysis may be provided to a simulation client at any time (e.g., as fast as technologically possible in fractions of a second or several seconds later) after receiving or obtaining the speech data. In order to try and mitigate a latency associated with asynchronously analyzing the speech data, the technology may be used to predict a conversation flow path and instruct a simulation client to download communication expressions associated with the predicted conversation flow path prior to the expected use of the communication expressions. For example, keywords identified in speech data may be used to predict a conversation flow path and communication mark data representing communication expressions associated with the predicted conversation flow path may be provided to a simulation client.

Figure 1:
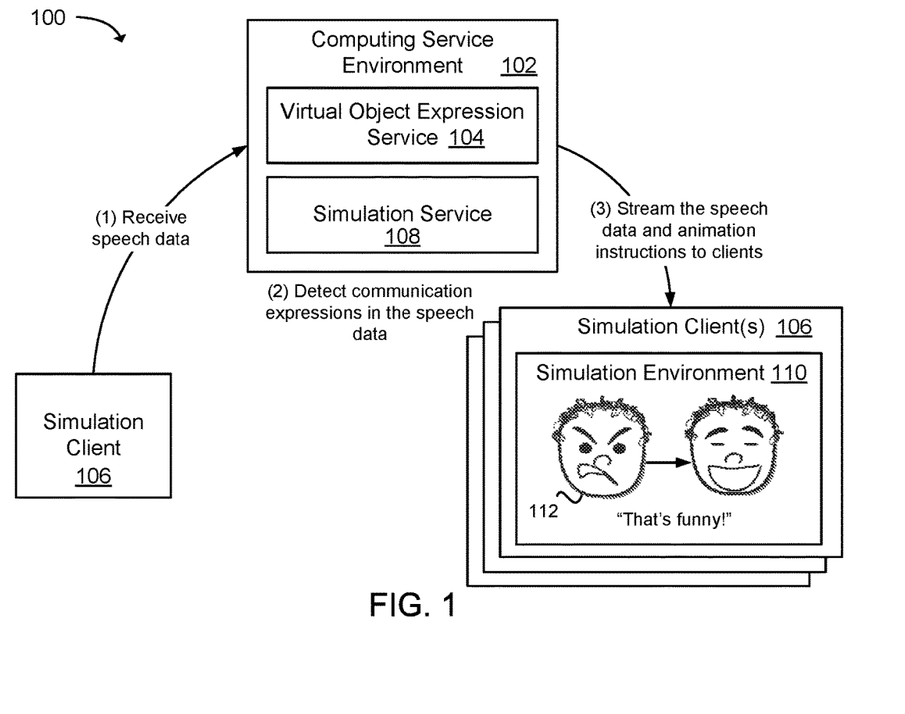
FIG. 1 is a block diagram illustrating an example system and method used to provide users with a simulation experience in which virtual objects may be animated to simulate communication expressions detected in speech data.

To further describe the present technology, examples are now provided with reference to the figures. FIG. 1 is a block diagram illustrating a high level example of a system 100 used to provide users with a simulation experience in which users interact with virtual objects that simulate communication expressions detected in speech data. Communication expressions may include visual expressions and vocal expressions used to convey a feeling or emotion. For example, a visual expression may include a facial expression or physical gesture used to convey an emotion, and a vocal expression may include a voice, pitch, tone, or sound effect that conveys an emotion. The system 100 may allow users to interact with one another via virtual objects 112 (e.g., avatars or animated characters) in a simulation environment 110 (e.g., virtual reality, augmented reality, or mixed reality environment) rendered on the user's simulation clients 106. Simulation clients 106 may include client devices, such as headsets and computing devices capable of generating a VR, AR, or mixed reality environment. A VR environment may include a computer generated environment that includes images, sounds, and other sensations that together simulate a user's presence in a virtual three dimensional (3D) environment. An augmented reality environment may include a direct or indirect view of a physical, real-world environment whose elements are augmented by computer-generated sensory input, such as sound, video, and graphics. A mixed reality environment may comprise merging of real world and virtual worlds to produce new environments and visualizations where physical and digital objects co-exist and interact in real-time.

In one example, a virtual object 112 may be hosted on a simulation client 106. A simulation service 108 hosted in a computing service environment 102 may stream speech data and animation instructions to the simulation client 106. Animation instructions may include computer instructions for rendering 2D or 3D animation of a virtual object 112. Communication mark data is one example of animation instructions. In another example, a virtual object file or group of virtual object files may be streamed to a simulation client 106 from the computing service environment 102. The virtual object file may include graphics, speech data, and communication mark data used by a simulation client 106 to render a virtual object 112.

Virtual objects 112 included in a simulation environment 110 may simulate communication expressions detected in the speech of a user captured in audio data or textual data. Communication expressions detected in the speech of a user may include: facial expressions, vocal expressions, body gestures, as well as other types of expressions. The communication expressions made by a user can be detected in speech provided by the user. For example, an expression of excitement conveyed through a user's speech may be detected and a virtual object 112 representing the user may be animated to simulate the user's excitement. For example, hand waving may be included or an exclamation mark may be placed over an avatar's head.

In one configuration, virtual objects 112 may simulate a personality type. For example, a virtual object 112 can be animated to exhibit personality traits associated with different personality types. As an illustration, a user can specify a personality type for a virtual object 112 representing the user by specifying a personality type in a user profile.

As illustrated, the system 100 may include a computing service environment 102 that is in network communication with a plurality of simulation clients 106. In one example, the computing service environment 102 may include managed services provided by a computing service provider. The computing service environment 102 may provide virtual reality, augmented reality, or mixed reality resources to the simulation clients 106. For example, the computing service environment 102 may host simulation sessions (VR, AR, or mixed reality simulation sessions) using computing resources (e.g., a simulation service 108) included in the computing service environment 102. Users may create and join the simulation sessions and interact with one another via virtual objects 112 generated in a simulation environment 110. For example, a simulation client 106 may send user interaction data (e.g., speech text and audio, graphics and video, position tracking and mapping, etc.) to the computing service environment 102 and the user interaction data may be provided to other simulation clients 106. More specifically, a user may communicate with other users by speaking into a microphone or typing on a keyboard and a simulation client 106 may send the speech data containing the user's communication to the computing service environment 102 and a simulation service 108 and virtual object expression service 104, which in turn may send speech data containing the user's communication to other simulation clients 106 included in a simulation session.

The computing service environment 102 may include a virtual object expression service 104. The virtual object expression service 104 may be configured to analyze speech data (e.g., audio and/or text) received from a simulation client 106 for indicators of communication expressions made by a user and generate communication mark data that includes expression tags representing the communication expressions. The expression tags may indicate communication expressions that can be simulated using a virtual object 112. For example, expression tags may indicate expressions of sentiment and personality that can be simulated using expression animations (e.g., facial expressions and body gestures) and/or audio (e.g., voice modulation). Also, the expression tags may be associated with a communication mark time that corresponds to an occurrence of a communication expression. The communication mark time (e.g., a timestamp or time marker) may be used to synchronize animation of a virtual object with audio or textual output to simulate the communication expression.

The simulation clients 106 may evaluate expression tags included in communication mark data and identify virtual object expression animations (e.g., visual animations), and identify speech parameters (e.g., voice modulation parameters) associated with expressions indicated by the expression tags. The simulation clients 106 may animate a virtual object 112 in a simulation environment 110 using the virtual object expression animations (e.g., generate facial expressions using the virtual object expression animations) and the speech parameters. The animation of the virtual object 112 may be synchronized with corresponding audio or text, such that the animation and speech may simulate communication expressions represented by the expression tags.

In one example configuration, the virtual object expression service 104 may analyze speech data for keywords, phrases, patterns, and other indicators that may be associated with a communication expression. For example, keywords may indicate a state of being, facial expression, body movement, etc., and phrases and patterns may be associated with a particular expression or indicate a conversational flow associated with one or more expressions. As an example, speech data or audio data received from a simulation client 106 may be converted to text using speech recognition. The text may be submitted to a natural language service for analysis and identification of words, phrases, and patterns that may be linked to certain communication expressions. For example, a word pattern, such as "glad to see you" or "having a great day", may be linked to expressions of happiness and/or excitement, and word patterns, such as "not feeling well" or "feeling down", may be linked to expressions of sadness and/or sorrow. The virtual object expression service 104 may be configured to identify communication expressions linked to the words, phrases, and patterns identified by the natural language service and generate communication mark data that represents the communication expressions.

As described earlier, latency associated with asynchronously analyzing speech data may be mitigated by predicting a conversation flow path and instructing a simulation client 106 to download communication expressions associated with the predicted conversation flow path in advance. For example, a simulation client 106 may be instructed to simulate a communication expression detected in speech data and thereafter, simulate communication expressions associated with the predicted conversation flow path until further animation instructions are provided to the simulation client 106. For example, evaluation of a predicted conversation flow path may indicate that a conversation is moving in an "excited" direction, and in response, "excited" expressions may be preemptively downloaded and animated until a "neutral" conversation direction is detected and "neutral" expressions may be preemptively animated. In one example, the virtual object expression service 104 may be configured to analyze speech data for keywords and identify a conversation flow path associated with a keyword. After identifying the predicted conversation flow path, a communication expression associated with the predicted conversation flow path may be identified and downloaded in advance of the communication expressions predicted use and communication mark data representing the communication expression may be generated and provided to a simulation client 106.

In another example configuration, a user video data stream received from a first simulation client 106 may be analyzed to detect communication expressions using the virtual object expression service 104, and a data stream that includes speech data and communication mark data may be streamed to a second simulation client 106, or a plurality of simulation clients 106 configured to simulate the communication expressions detected in the user's video stream. As an illustration, a user's camera may be used to capture a video of the user's communication expressions and a simulation client 106 may stream the video to the virtual object expression service 104. The video stream may be analyzed for the user's communication expressions and a data stream that includes communication mark data may be generated and sent to other simulation clients 106 configured to animate virtual objects 112 to simulate the user's communication expressions. For example, if a user is smiling in the user video data stream, then the user's avatar may also be animated with smiling as indicated through the communication mark data.

In one example, a user may create a virtual object profile that includes attributes for the virtual object 112. The attributes may be associated with types of communication expressions that may be simulated using the user's virtual object 112. For example, attributes may include a personality type or a personality range (e.g., subtle to obvious) for a user's virtual object 112. A user can select attributes for the user's virtual object 112 and the attributes may be used to animate the user's virtual object 112 on a simulation client 106. For example, the virtual object profile may be retrieved when speech data is received from a user's simulation client and attributes included in the virtual object profile may be added to communication mark data. The communication mark data may also be provided to other simulation clients 106 used by other users and the users' virtual object 112 may be animated using the attributes.

As indicated above, communication expressions detected in speech data may be represented using expression tags included in communication mark data. For example, the communication mark data may include SSML (Speech Synthesis Markup Language). In one example, the SSML may be extended to include markup tags that represent communication expressions detected in speech data. The virtual object expression service 104 may generate markup tags for communication expressions detected in speech data and provide the markup tags to a simulation client 106, along with speech data via a data stream, and the simulation client 106 may evaluate the markup tags and animate a virtual object 112 to simulate the communication expressions represented by the markup tags. In some examples, a simulation client 106 may be configured to generate an AR (Augmented Reality) environment that includes a virtual object 112.

Figure 2:
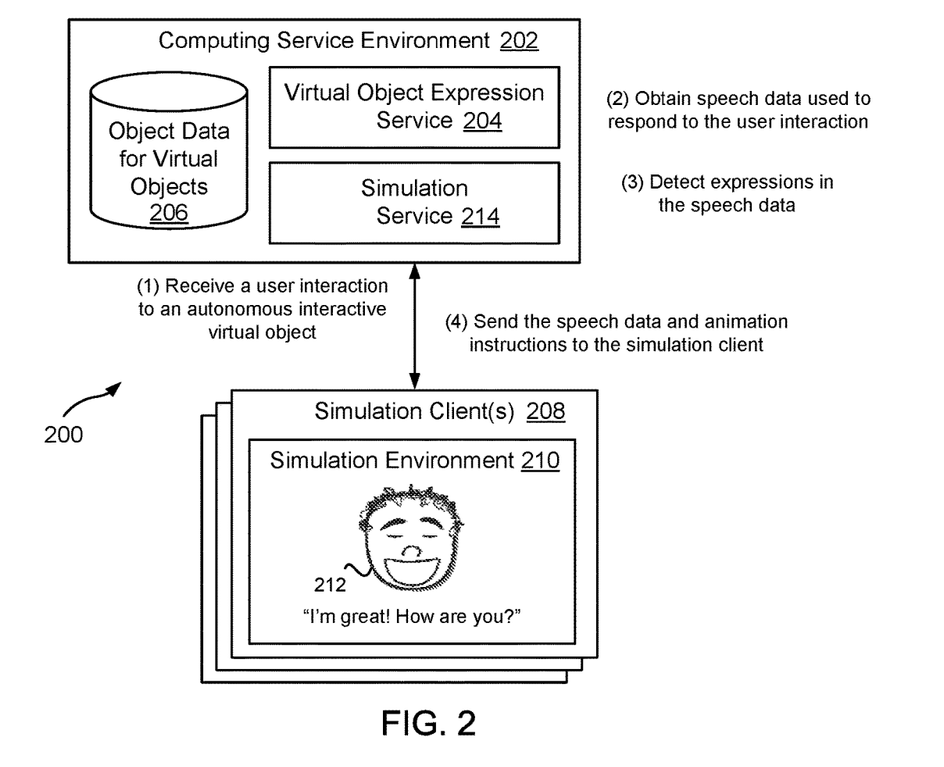
FIG. 2 is a block diagram that illustrates an example system and method used to provide users with a simulation environment that includes an autonomous interactive virtual object which may be animated to simulate communication expressions detected in speech data.

FIG. 2 is a block diagram illustrating a high level example of a system 100 and method used to provide users with a simulation environment 210 that includes a virtual object which may be an autonomous interactive virtual object 212, such as a bot, chatbot, talkbot, or the like. The autonomous interactive virtual object 212 may be animated to simulate communication expressions detected in speech data. Users may interact with the autonomous interactive virtual object 212 using speech, text, and/or video input. As an example, a user may ask the autonomous interactive virtual object 212 a question, like "How are you doing today?", via speech or text, and the autonomous interactive virtual object may respond with "I'm great! How are you?"

The system 200 may include a computing service environment 202 that may be in network communication with one or more simulation clients 208. A simulation client 208 may be a device, such as a headset or computing device capable of animating the autonomous interactive virtual object 212. In one example, a simulation client 208 may be provided with object data 206 for the autonomous interactive virtual object 212 from the computing service environment 202 which may host the object data 206 for the autonomous interactive virtual object 212. Alternatively, the object data 206 for virtual objects may be stored in a data store that is in a location separate from the computing service environment 202. The object data 206 may include virtual object graphics, communication expression animations, speech data, speech text, animation instructions, object location data, communication logic, object management logic, or any other information needed to display and manage the autonomous interactive virtual object 212. The simulation client 208 may use the object data 206 to render the autonomous interactive virtual object 212 in a simulation environment 210. In another example, a portion of the object data 206 for the autonomous interactive virtual object 212 may be hosted on a simulation client 208, such as virtual object graphics, and the simulation client 208 may obtain the remaining portion of the object data 206, such as speech text and animation instructions, from the computing service environment 202.

In one example, a computing service provider may provide customers with a platform for hosting customer created object data 206 for autonomous interactive virtual objects 212. A customer may create an autonomous interactive virtual object 212 and utilize services provided by the computing service provider, such as a simulation service 214, natural language analysis, speech recognition, text-to-speech, and virtual object expression service 204, to support the autonomous interactive virtual object 212. For example, a customer's autonomous interactive virtual object 212 may be hosted in a data store of the computing service environment 202, and the services provided by the computing service provider may be used to support interactions from other users or customers with the customer's autonomous interactive virtual object 212.

A simulation client 208 may send user interaction data (i.e., speech or textual data from a user that is directed to an autonomous interactive virtual object 212) to the simulation service 214 in the computing service environment 202. The user interaction data may be sent due to user interaction with a customer's autonomous interactive virtual object 212. For example, a user may interact with the autonomous interactive virtual object 212 by speaking into a microphone or submitting text via an input device. The user interaction data may be evaluated using the services provided by the computing service provider, such as speech-to-text and natural language analysis services. As an example, user interaction data may be analyzed using a natural language service to determine a user's intent (e.g., a keyword or phrase linked to an action) and an action linked to the intent. The intent and action may be used to obtain a response to the user's interaction. For example, the intent and action may be used to obtain speech text included in the object data 206 that corresponds to the intent and action, and the speech text (e.g., the response) may be analyzed for indicators of communication expressions, which may be used to generate communication mark data (e.g., animation instructions). The speech text and the communication mark data may be provided to the simulation client 208 and the simulation client 208 may animate the autonomous interactive virtual object 212 to simulate communication expressions detected in the speech text.

As illustrated, the computing service environment 202 may include a virtual object expression service 204 that may be used by customers of the computing service provider to animate the customer's virtual objects to simulate communication expressions. As one example, a customer may provide (e.g., upload) speech data to the computing service environment 202, which may be stored as object data 206. The speech data may include text or audio. The virtual object expression service 204 may be used to detect communication expressions in the speech data (e.g., from audio or videos) and generate communication mark data used to animate the customer's autonomous interactive virtual object 212. As another example, a customer may use a computing service provider's AI (Artificial Intelligence) service including natural language understanding and natural language response to respond to user interactions with the user's autonomous interactive virtual object 212. Speech text generated by the AI services may be analyzed using the virtual object expression service 204 to detect communication expressions in the speech text and generate communication mark data for animating the customer's autonomous interactive virtual object 212 as the speech text is presented or output.

In one example configuration, the virtual object expression service 204 may obtain speech text in response to an interaction with an autonomous interactive virtual object 212 that causes the autonomous interactive virtual object 212 to respond. For example, the speech text may be obtained from object data 206 for the autonomous interactive virtual object 212 in response to receiving user interaction data (e.g., audio or textual data) from a simulation client 208. In one example, the speech text may be analyzed for communication expressions. For example, the speech text may be analyzed for keywords, phrases, patterns, and other indicators that may be associated with a communication expression, which may be used to generate communication mark data.

In the case that a simulation client 208 outputs audio for an autonomous interactive virtual object 212, speech text for the autonomous interactive virtual object 212 may be converted to an audio stream and the audio stream may be provided along with communication mark data to the simulation client 208 and the simulation client 208 may synchronize animation of the autonomous interactive virtual object 212 to the audio stream using the communication mark data. Thus, the expression tags included in the communication mark data may be used by the simulation client 208 to animate the autonomous interactive virtual object 212 to simulate communication expressions represented by the expression tags and synchronize the animation with output of the audio stream.

Figure 3:
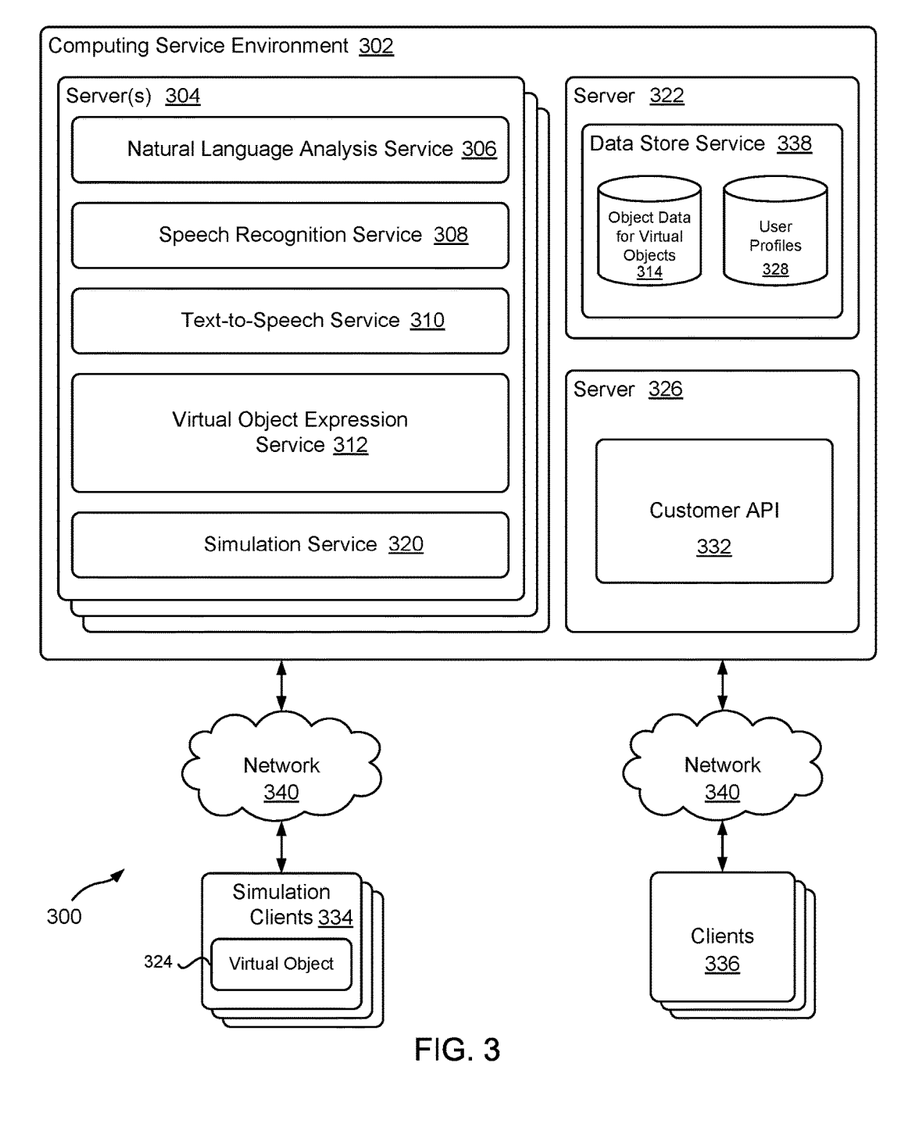
FIG. 3 is a block diagram that illustrates various example components in a system for detecting communication expressions in speech data and providing animation instructions for animating the communication expressions to a simulation client.

FIG. 3 illustrates components of an example system 300 on which the present technology may be executed. The system 300 may include a number of servers 304, 322, 326 located in a computing service environment 302, which assist in providing services for the computing service environment 302. The computing service environment 302 may include computing resources for executing computing instances (e.g., virtual machines), which may be an instance of a software implementation of a machine (i.e. a computer) used to emulate a physical machine and act as server, as described in greater detail later in association with FIG. 4.

The server 304 may host a simulation service 320. In one example, the simulation service 320 may be configured to manage simulation sessions (VR, AR, or mixed reality simulation session) and interactions in the simulation environment or simulated world. Users, via simulation clients 334, may create and join a simulation session and interact with one another via virtual objects 324 generated in a simulation environment on the simulation clients 334. A simulation client 334 may send user interaction data (e.g., speech text and audio, graphics, expression animations, and video, position tracking, etc.) to the simulation service 320, and the simulation service 320 may provide the user interaction data to other simulation clients 334 included in a simulation session. As part of providing user interaction data to simulation clients 334, the simulation service 320 may be configured to detect indicators associated with communication expressions in speech text, audio, and/or video, and provide communication mark data (e.g., animation instructions) to a simulation client 334. The simulation client 334 may use the communication mark data to simulate the communication expressions using a virtual object 324.

In another example, the simulation service 320 may be configured to provide simulation clients 334 with object data 314 for virtual objects 324, such as bots, chatbots, talkbots, simulated characters, computer controlled avatars, etc. For example, a simulation client 334 may connect to the simulation service 320 over a network and the simulation service 320 may provide a bot, chatbot, talkbot, computer controlled character, avatar or similar virtual objects 324 to the simulation client 334. As part of providing object data 314 for a virtual object 324 to a simulation client 334, the simulation service 320 may provide communication mark data for the virtual object 324 used by the simulation client 334 to animate the virtual object 324 and to simulate communication expressions detected in speech data for the virtual object 324. For example, a bot, chatbot, talkbot, autonomous character, or the like may be animated to simulate communication expressions detected in the dialog of the bot, chatbot, talkbot, or similar simulated persona or object.

The simulation service 320 may obtain communication mark data representing animation instructions for simulating communication expressions detected in speech data from a virtual object expression service 312. In one example, the virtual object expression service 312 may be configured to analyze speech data for indicators of communication expressions. For example, speech data for a virtual object 324 may be analyzed for words, phrases, language context, patterns, and the like that correlate to communication expressions. Illustratively, the word "happy" may correlate to expressions of happiness. The phrase "It will be nice to see you again" may correlate to expressions of anticipation. The phrase "Way to go!" may correlate to expressions of excitement. Language context may be used to associate a word, phrase, pattern, etc. with a communication expression. For example, the phrase "I love you" within the context of a married couple may correlate to expressions of romance, whereas the same phrase in the context of a parent and child may correlate to expressions of caring and tenderness. Patterns detected in speech data may be correlated to a communication expression. As an example, a pattern of dissatisfaction detected in speech data may be correlated to communication expressions of dissatisfaction or unhappiness, which in turn may be animated with corresponding animations or audio modifications.

The speech data analysis described above may be performed asynchronously. More specifically, asynchronous processing of the speech data may be performed as speech data is received from a simulation clients 334 (e.g., a simulation session scenario) or obtained for use with a bot, chatbot, talkbot, or the like. As such, the virtual object expression service 312 may be configured to analyze the speech data for a predicted conversation flow path and generate communication mark data that represents communication expressions associated with the predicted conversation flow path. In doing so, a simulation client 334 may be provided with communication mark data for communication expressions detected in speech data and communication mark data for a predicted conversation flow path. The communication mark data for the predicted conversation flow path may be used to animate a virtual object 324 during times that communication mark data for detected communication expressions is not available due to asynchronous processing latency. In one example, the virtual object expression service 312 may be configured to analyze speech data to detect a communication expression, and in parallel, analyze the speech data for keywords (e.g., words and/or phrases) linked to a conversation flow path. Thus, object data 314 for expected communication expressions may be sent to a simulation client 334 in advance of a conversation that is predicted to take place. For example, if the conversation is taking a "sad" path, then object data 314 that provides "sad" communications may be pre-loaded into the simulation clients 334 before a predicted portion of the conversation occurs.

In another example, a pre-recorded conversation tree may be traversed to identify one or more branches or nodes with keywords identified in the speech data and communication expressions associated with the conversation tree branches or nodes may be identified. As an example, a conversational interface for a chatbot may use a natural language analysis service 306 to determine an intent of a user interacting with the chatbot. For example, speech data received from the user may be provided to the natural language analysis service 306 and the natural language analysis service 306 may analyze the speech data for an intent that the user is conveying or an intent action the user wants performed. A conversation node or branch that corresponds to the intent may be identified and analyzed using the virtual object expression service 312 to identify communication expressions associated with the conversation branch or node. Communication mark data representing the communication expression associated with the conversation branch or node may be generated and provided to a simulation client 334. As an illustration, analysis of speech data provided by a user may indicate that the user wants to order a product. A conversation tree associated with ordering the product may be identified and the nodes of the conversation tree may be analyzed to identify communication expressions associated with the nodes. For example, conversation tree nodes associated with fulfilling the product order request may be associated with various communication expressions, such as a facial expression associated with a willingness to help the user, or a facial expression associated with a disappointment that the product is out of stock. In one example, a conversation tree may be traversed using keywords identified in a speech data to predict the direction of a conversation flow and communication expressions associated with the predicted conversation flow may be provided to a simulation client 334. These predictions may enable object data 314 matching communication expressions to be sent to the simulation client 334 to ensure that the object data 314 is available in a timely manner or in advance of the use the object data 314.

In addition, the virtual object expression service 312 may be configured to identify an imminent change of communication expression in speech data by analyzing the speech data for an indication (e.g., keyword) that a mood of a conversation may be about to change (e.g., from happy to angry). In response to identifying the imminent change of expression, the virtual object expression service 312 may generate communication mark data to include an expression tag that represents the imminent change of expression, such that a simulation client 334 may evaluate the expression tag and revise (e.g., smooth) the animation of a virtual object 324 from a first animated expression (e.g., a communication expression simulated by a virtual object 324) to a second animated expression associated with the imminent change of expression. As an example, analysis of speech data may indicate an expletive associated with an angry communication expression that may be different from a happy communicative expression currently being simulated by a virtual object 324. In response, the imminent change of expression may be provided to a simulation client 334 in communication mark data allowing the simulation client 334 to smooth animation of the virtual object 324 to simulate the change of expression.

In one example, communication mark data generated using the virtual object expression service 312 may include expression tags that represent communication expressions detected in speech data. As an illustration, expression tags may specify communication expressions like "smiling", "laughing", "frowning", "sulking", etc. The expression tags may also represent virtual object attributes, such as a virtual object type, a persona, a lexicon, a language, and a personality type. In one example, communication mark data may include extended SSML that includes expression tags representing communication expressions detected in speech data. The communication mark data may include additional expression tags used to animate a virtual object 324, such as sentence elements that indicate sentences in the speech data, word elements that indicate words in the speech data, and phonetic data (e.g., visemes) that indicate face and mouth movements that correspond to phonemes in speech data. The expression tags may be used by a simulation client 334 to identify graphics, expression animations, and/or speech parameters linked to the expression tags and use the graphics, expression animations, and/or speech parameters to animate the virtual object 324. Markup tags may include a timestamp that corresponds to a time occurrence of a communication expression in speech data. The timestamp may be used to synchronize the animation of a virtual object 324 with audio or textual output to simulate a communication expression. A simulation client 334 may use the timestamp to determine when to animate a virtual object 324 to simulate a particular communication expression. As a specific example, a communication mark time may a timestamp for a simulation client 334 to animate a virtual object 324 to simulate a smile that coincides with audio output that includes expressions of happiness.

In one example, the virtual object expression service 312 may utilize other services to process speech data and analyze the speech data. For example, the virtual object expression service 312 may utilize a speech recognition service 308 to convert audio data to textual data, and utilize a natural language analysis service 306 to analyze the textual data for patterns that may be linked to communication expressions. As an illustration, the virtual object expression service 312 may receive audio to be output from a simulation client 334 and provide the audio to be output to the speech recognition service 308. The speech recognition service 308 may convert the audio to be output to text and return the text to the communication expression service 308. The virtual object expression service 312 may provide the text to the natural language analysis service 306. The natural language analysis service 306 may analyze the text for words, phrases, and/or patterns and return the results of the natural language analysis to the communication expression service 308. The communication expression service 308 may then attempt to correlate the results of the natural language analysis to a communication expression. As an illustration, the natural language analysis service 306 may a detect phrase, such as "Good morning", and the virtual object expression service 312 may identify a communication expression for visually animating that correlates to the phrase.

A text-to-speech service 310 configured to convert speech text to an audio stream and generate animation instructions may be used to provide an audio stream and animation instructions to a simulation client 334. Animation instructions may be used by a simulation client 334 to synchronize animation of a virtual object with an audio stream. In one example, animation instructions may include communication mark data. A simulation client 334 may use the communication mark data for facial animation of a virtual object.

A simulation client 334 may be configured to generate or display a simulation environment that includes a virtual object 324. A simulation environment may include a VR, AR, or mixed reality environment. A simulation client 334 may be in network communication with the simulation service 320 hosted in the computing service environment 302. For example, a simulation client 334 may receive a data stream that includes speech data and communication mark data for a virtual object 324. In one example, data files for the virtual object 324, such as graphics or expression animations, may have been previously downloaded and stored on a simulation client 334. The simulation client 334 may animate the virtual object 324 to simulate communication expressions represented in the communication mark data and synchronize the animated expressions with audio or textual output provided in the speech data. As an illustration, a facial expression (e.g., happy, sad, etc.) simulated using a virtual object 324 may be synchronized with speech that corresponds to the facial expression.

In one example, the server 326 may host a customer API used by customers of a computing service provider to manage object data 314 for virtual objects 324. For example, a customer may create, upload, and/or modify object data 314 for the customer's virtual object 324, as well as manage a user profile 328 that includes virtual object attributes for a virtual object 324 used to represent a user (e.g., an avatar). For example, a user may specify a personality type, persona, lexicon, etc. for the user's avatar using a user profile 328.

Object data 314 for a customer's virtual object 324 may be stored on data stores managed by a data store service 338. For example, a customer may create a chatbot and store the chatbot on a data store managed by the data store service 338. The term "data store" may refer to any device or combination of devices capable of storing, accessing, organizing and/or retrieving data, which may include any combination and number of data servers, relational databases, object oriented databases, NoSQL data stores, cluster storage systems, data storage devices, data warehouses, flat files and data storage configuration in any centralized, distributed, or clustered environment. The storage system components of the data store may include storage systems such as a SAN (Storage Area Network), virtualized storage systems, volatile or non-volatile RAM, optical media, or hard-drive type media. The data store may be representative of a plurality of data stores as can be appreciated.

A customer may use a client 336 to access the customer API 332. A client 336 may include a client device capable of sending and receiving data over a network 340. A client device may comprise, for example a processor-based system such as a computing device. A client device may be a device such as, but not limited to, a desktop computer, laptop or notebook computer, tablet computer, mainframe computer system, handheld computer, workstation, network computer, or other devices with like capability.

The various processes and/or other functionality contained within the system 300 may be executed on one or more processors that are in communication with one or more memory modules. The system 300 may include a number of computing devices that are arranged, for example, in one or more server banks or computer banks or other arrangements. The computing devices may support a computing environment using hypervisors, virtual machine monitors (VMMs) and other virtualization software.

API calls, procedure calls, or other network commands that may be made in relation to the services included in the computing service environment 302 may be implemented according to different technologies, including, but not limited to, Representational state transfer (REST) technology or Simple Object Access Protocol (SOAP) technology. REST is an architectural style for distributed hypermedia systems.

A RESTful API (which may also be referred to as a RESTful web service) is a web service API implemented using HTTP and REST technology. SOAP is a protocol for exchanging information in the context of Web-based services.

The network 340 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 3 illustrates that certain services and processing modules may be discussed in connection with this technology. In one example configuration, a service may comprise one or more processes executing on a server or other computer hardware. Such services may be centrally hosted functionality or a service application that may receive requests and provide output to other services or consumer devices. For example, services may be considered on-demand computing that are hosted in a server, virtualized service environment, grid or cluster computing system. An API may be provided for each service to enable a second service to send requests to and receive output from a first service. Such APIs may also allow third parties to interface with the services and make requests and receive output from the services. While FIG. 3 illustrates an example of a system that may implement the techniques above, many other similar or different environments are possible. The example environments discussed and illustrated above are merely representative and not limiting.

Figure 4:
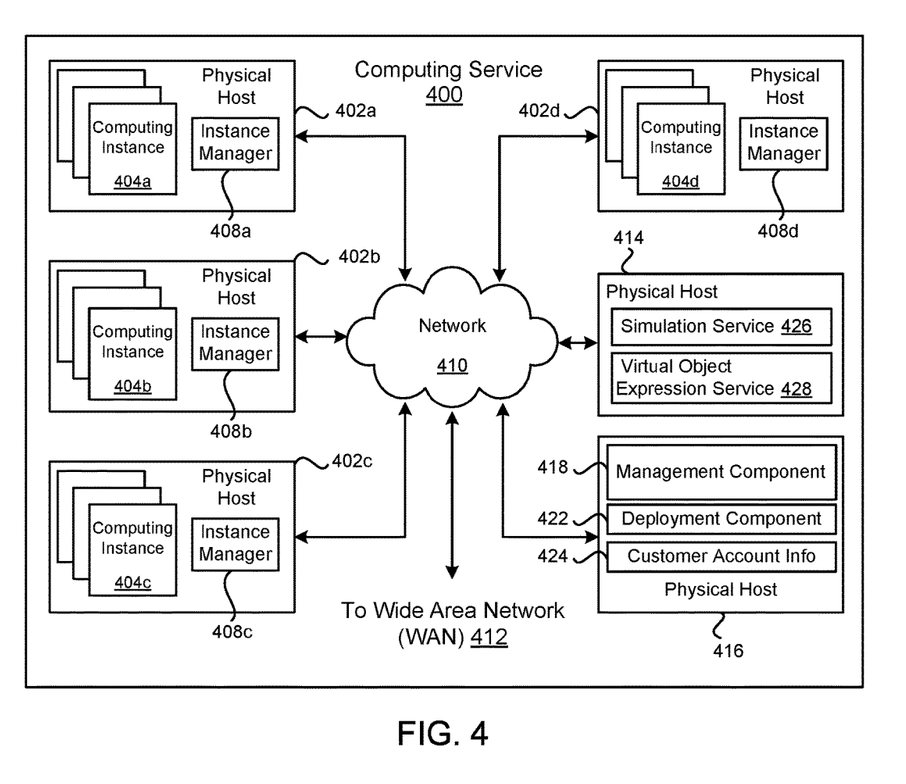
FIG. 4 is a block diagram that illustrates an example computing service environment that includes a simulation service.

FIG. 4 is a block diagram illustrating an example computing service 400 that may be used to execute and manage a number of computing instances 404a-d. In particular, the computing service 400 depicted illustrates one environment in which the technology described herein may be used. The computing service 400 may be one type of environment that includes various virtualized service resources that may be used, for instance, to host computing instances 404a-d.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Those familiar with the art will recognize that the computing service 400 may be described as a "cloud" environment.

The particularly illustrated computing service 400 may include a plurality of server computers 402a-d. While four server computers are shown, any number may be used, and large data centers may include thousands of server computers. The computing service 400 may provide computing resources for executing computing instances 404a-d. Computing instances 304a-d may, for example, be virtual machines. A virtual machine may be an instance of a software implementation of a machine (i.e. a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

One or more server computers 414 and 416 may be reserved to execute software components for managing the operation of the computing service 400 and the computing instances 404a-d. For example, a server computer 414 may execute a simulation service 426 and a virtual object expression service 428 that perform the functions described earlier. A server computer 416 may execute a management component 418. A customer may access the management component 418 to configure various aspects of the operation of the computing instances 404a-d purchased by a customer. For example, the customer may setup computing instances 404a-d and make changes to the configuration of the computing instances 404a-d.

A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache should be prepared, and other types of information. The deployment component 422 may utilize the customer-provided configuration and cache logic to configure, prime, and launch computing instances 404a-d. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402a-d, 416. The network 410 may be a local area network (LAN) and may be connected to a Wide Area Network (WAN) 412 or the Internet, so that end customers may access the computing service 400. The network topology illustrated in FIG. 4 has been simplified, many more networks and networking devices may be utilized to interconnect the various computing systems disclosed herein.

Figure 5:
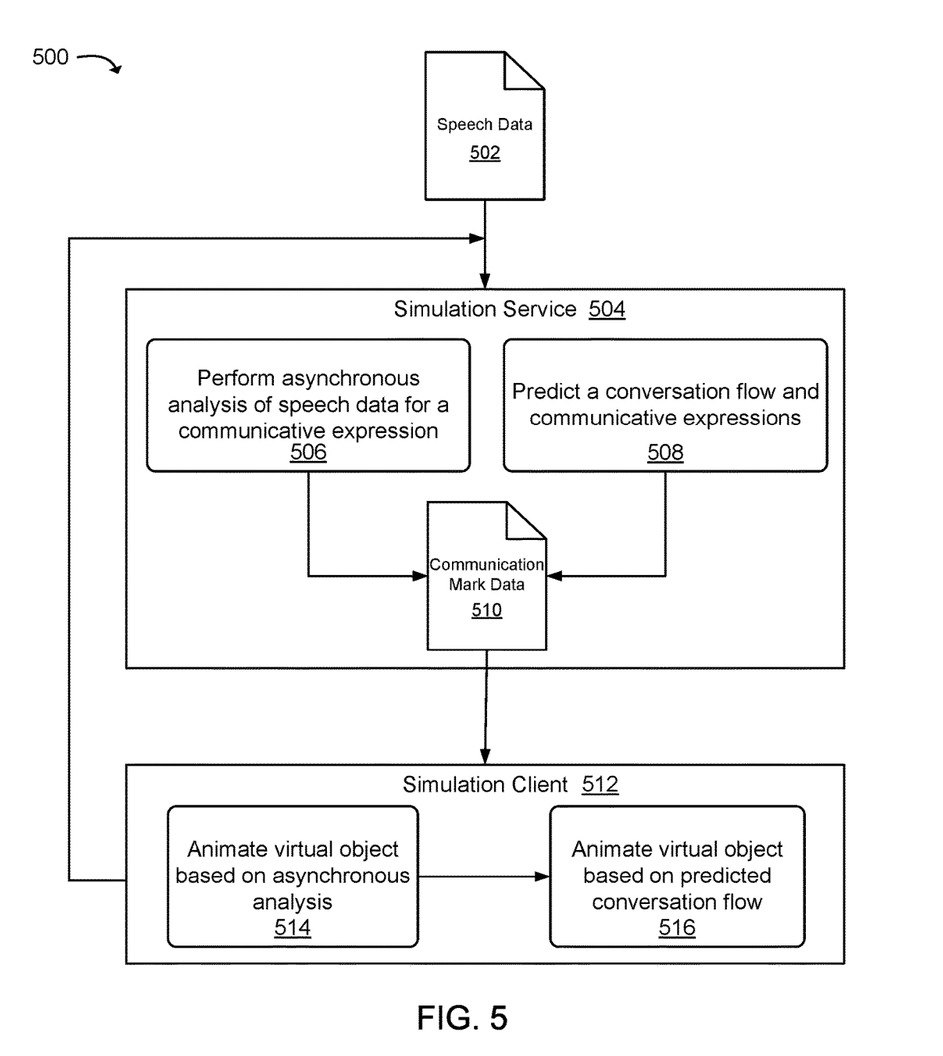
FIG. 5 is a flow diagram that illustrates an example method for analyzing speech data to identify indications of communication expressions that may be simulated using a virtual object.

Moving now to FIG. 5, a flow diagram illustrates an example method 500 for analyzing speech data 502 to identify indications of communication expressions that may be simulated using a virtual object. As illustrated, speech data 502 may be provided to a simulation service 504. The simulation service 504 may be configured to analyze the speech data 502 for indications of communication expressions using the services described earlier. More specifically, after receiving the speech data 502, as in block 506, asynchronous analysis of the speech data 502 may be performed to identify indications of communicative expressions. For example, the speech data 502 may be analyzed for a word, phrase, or pattern that may be associated with a communication expression. A communication expression associated with a word, phrase, or pattern included in the speech data 502 may be identified and communication mark data 510 representing the communication expression may be generated.

In parallel (or optionally in sequence) to performing the asynchronous analysis of the speech data 502, as in block 508, a conversation flow path may be predicted using the speech data 502 and communicative expressions associated with the predicted conversation flow path may be identified. In one example, the speech data 502 may be analyzed for keywords or key-phrases that indicate a conversation flow path. The keywords or key-phrases may indicate a conversation flow path that expresses some feeling or emotion. For example, a conversation flow path may be associated with a feeling of excitement or anger. Based on the conversation flow path indicated by the keyword or key-phrase, a communication expression may be identified.

After identifying one or more communication expressions associated with the predicted conversation flow path, communication mark data 510 representing the communication expressions may be generated. The communication mark data associated with the predicted conversation flow path may be provided to a simulation client 512 along with communication mark data associated with asynchronous analysis. In another example, communication mark data associated with a predicted conversation flow path and communication mark data associated with asynchronous analysis may be provided to the simulation client 512 separately.

The simulation client 512 may be configured to evaluate the communication mark data 510 and animate a virtual object to simulate communication expressions represented by the communication mark data 510. More specifically, as in block 514, the simulation client 512 may use the communication mark data associated with the asynchronous analysis to animate the virtual object and then, as in block 516, the simulation client 512 may use the communication mark data associated with the predicted conversation flow path to animate the virtual object. In doing so, latency associated with the asynchronous analysis may be mitigated by animating the virtual object to simulate communication expressions associated with the predicted conversation flow path until additional communication mark data 510 is received from the simulation service 504.

Figure 6:
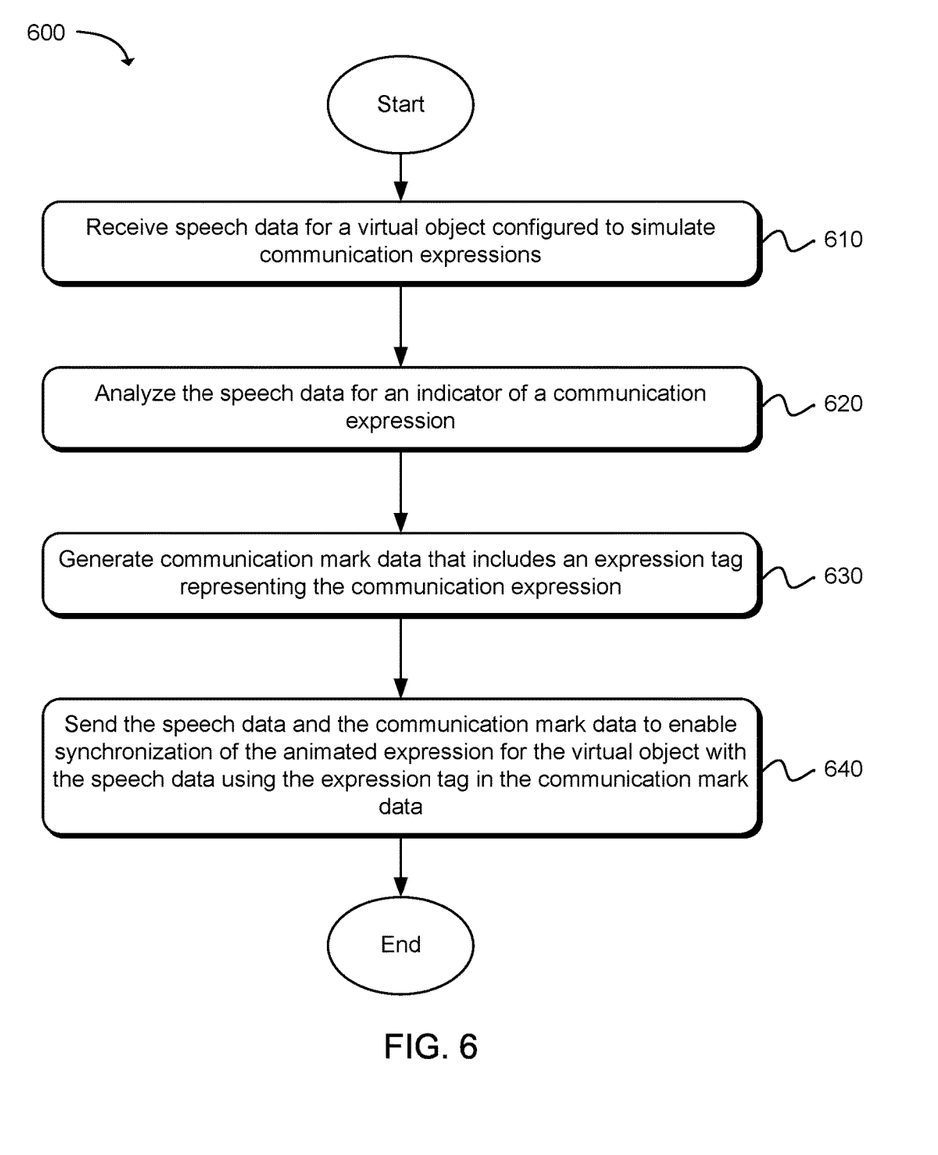
FIG. 6 is a flow diagram illustrating an example method for analyzing speech data for indicators of a communication expression and generating communication mark data representing the communication expression.

FIG. 6 is a flow diagram that illustrates an example method 600 for analyzing speech data for indicators of a communication expression and generating communication mark data representing the communication expression. As in block 610, speech data for a virtual object may be received. The virtual object may be used to simulate communication expressions associated with virtual object speech output provided by the speech data. The speech data may be any one of: audio data, textual data, or video data.

As in block 620, the speech data may be analyzed for an indicator of a communication expression. In one example, analyzing the speech data may include converting speech data received from a client from audio to text using a speech recognition technique. The text may then be analyzed using natural language analysis to identify a word, phrase, or pattern that may be associated with a communication expression. In one example, language context for a word, phrase, or pattern may be identified and a communication expression associated with the language context may be identified.

In some examples, the speech data may be analyzed to determine a predicted conversation flow path. For example, the speech data may be analyzed for a keyword or phrase that indicates a predicted conversation flow path. A communication expression associated with the predicted conversation flow path may be identified and communication mark data may be generated to include an expression tag that represents the predicted communication expression. In one example, the expression tag may be provided to a client ahead of a time that the predicted communication expression is to be simulated. This prediction may allow the appropriate object data and assets to be downloaded in advance of the predicted speech output.

As in block 630, communication mark data that includes an expression tag representing the communication expression may be generated. The expression tag may be assigned a communication mark time that corresponds to an occurrence of the communication expression in the speech data, and the communication mark time may be used to synchronize an animated expression with the communication expression in the speech data. In one example, generating the communication mark data may include adding an expression tag to SSML that represents the communication expression. In one example, the communication mark data may include expression tags that represent virtual object attributes retrieved from a virtual object profile. The virtual object attributes may include: a virtual object type, a persona, a lexicon, a language, and/or a personality type. Also, the communication mark data may include: a sentence element that indicates a sentence in the speech data, a word element that indicates a word in the speech data, and/or a phonetic data (e.g., a viseme) that indicates a face and mouth movement that corresponds to a phoneme in the speech data.

As in block 640, the speech data and the communication mark data may be sent to enable synchronization of the animated expression for the virtual object with the virtual object with the speech data using the expression tag in the communication mark data. For example, the speech data and the communication mark data may be sent to a simulation client configured to synchronize the animated expression with speech data using the expression tag in the communication mark data that represents the communication expression. In one example, the speech data and the communication mark data may be streamed to the simulation client using a data stream. This may enable a virtual object or avatar to have bodily animations that are synchronized with the audio output of the speech stream. In another example, the speech data and the communication mark data may be sent to a computing process, service, module or the like configured to process the speech data and communication mark data as part of animating a virtual object.

Figure 7:
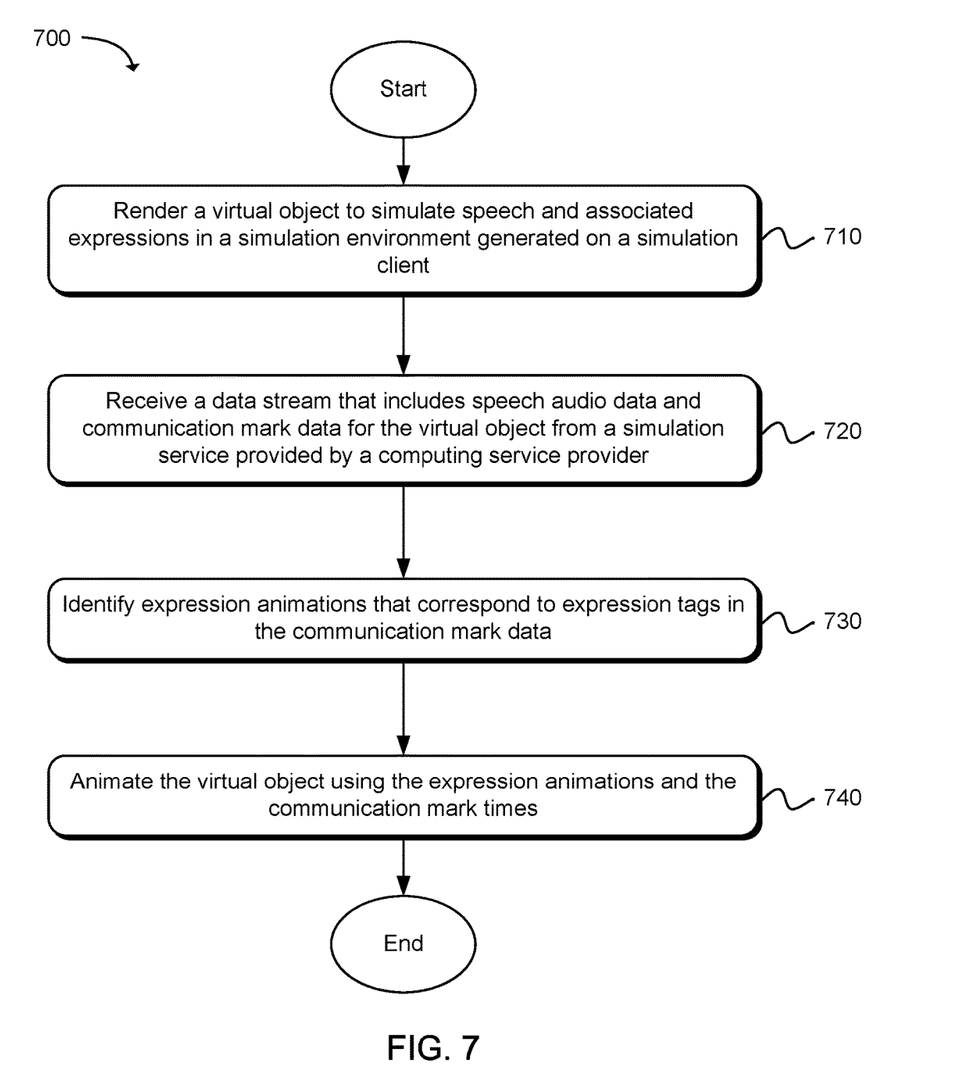
FIG. 7 is a flow diagram that illustrates an example method for rendering a virtual object to simulate communication expressions using a simulation client.

FIG. 7 is a flow diagram illustrating an example method 700 for rendering a virtual object to simulate communication expressions using a simulation client (e.g., a VR device). As in block 710, a virtual object may be rendered to simulate speech and associated expressions in a simulation environment using the simulation client. In one example, the virtual object may be configured to represent a remote user who provides speech data using a second simulation client. The virtual object may be configured to simulate human conversation and associated expressions in response to user interaction with the virtual object. For example, the virtual object may be an avatar that represents the remote user and the remote user may provide dialog for the avatar using the second simulation client. In one example, the virtual object (i.e., a virtual object file) may be received from a simulation service provided by a computing service provider. The virtual object file may include expression animations used to animate the virtual object.

As in block 720, a data stream that includes speech audio data and communication mark data for the virtual object may be received from the simulation service provided by the computing service provider. The communication mark data may include expression tags that represent communication expressions, and the expression tags may be assigned communication mark times that correspond to occurrences of the communication expressions in the speech audio data.

As in block 730, expression animations that correspond to the expression tags in the communication mark data may be identified. For example, the expressions animations may be downloaded in advance and stored on the simulation client or the expression animations may be streamed from a remote storage location when requested. As in block 740, the virtual object may be animated using the expression animations and the communication mark times, wherein the communication mark times may be used to synchronize animation of the virtual object using the expression animations with the speech audio data.

Figure 8:
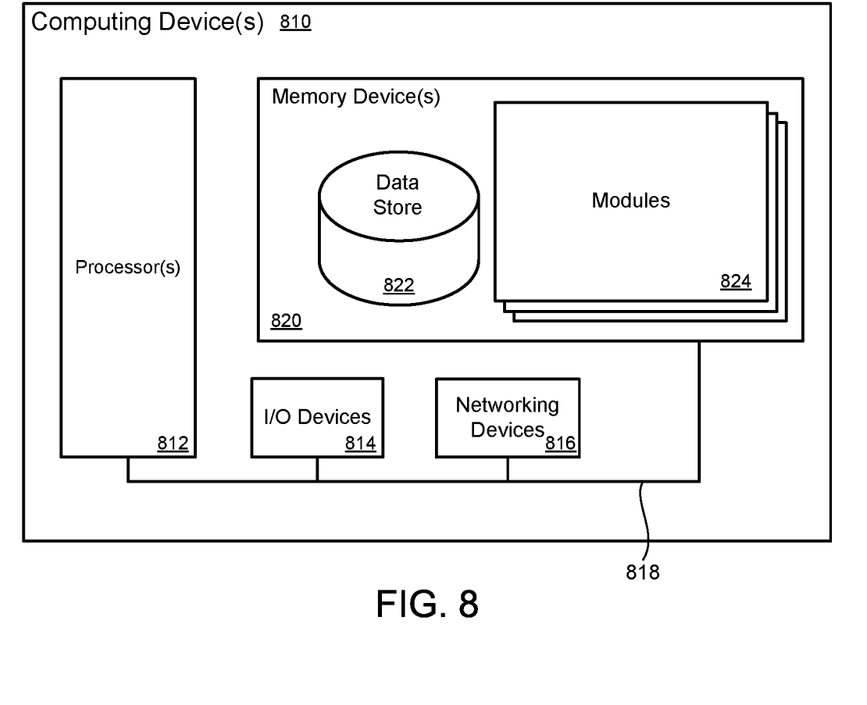
FIG. 8 is block diagram illustrating an example of a computing device that may be used to execute a method for analyzing speech data for indicators of communication expressions and generating communication mark data representing the communication expressions.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 that are executable by the processor(s) 812 and data for the modules 824. In one example, the memory device 820 may include a simulation module, a virtual object expression module, a text-to-speech module, a speech recognition module, a natural language analysis module, and other modules. The modules 824 may execute the services and functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system comprising:
   at least one processor;
   a memory device including instructions that, when executed by the at least one processor, cause the system to:
   obtain speech text for a virtual object configured to simulate communication expressions detected in speech data, wherein the speech text is obtained in response to an interaction with the virtual object that causes the virtual object to respond;
   obtain communication expression data for communication expressions associated with the speech text, wherein the communication expression data includes visual expression data and verbal expression data;
   generate communication mark data that includes expression tags for the communication expression data, wherein an expression tag in the communication mark data has a communication mark time that corresponds to an occurrence of a communication expression in the speech text represented by the expression tag;
   obtain a speech audio stream by submitting the speech text for the virtual object to a speech-to-text service; and
   initiate streaming of the speech audio stream and the communication mark data to a simulation client configured to synchronize animation of the virtual object and the speech audio stream using the communication mark data, wherein the animation of the virtual object includes animating the communication expressions represented by the expression tags.

2. The system in claim 1, wherein the memory device includes instructions that, when executed by the processor, cause the system to further:
   receive user interaction data for a user interaction with the virtual object; and
   analyze the user interaction data to determine an intent action that is used to obtain the speech text for the virtual object.

3. The system in claim 1, wherein the communication expression data is obtained by analyzing the speech text for a sentiment and identifying the communication expression data that corresponds to the sentiment.

4. The system in claim 1, wherein the communication expression data is obtained from personality settings for the virtual object, wherein the personality settings include defined personality types and personality ranges.

5. A computer implemented method, comprising:
   receiving speech data for a virtual object configured to simulate communication expressions in the speech data;
   converting the speech data from audio data to text data using speech recognition;
   analyzing the text data for an indicator of a communication expression;
   generating communication mark data that includes an expression tag representing the communication expression, wherein the expression tag is assigned a communication mark time that corresponds to an occurrence of the communication expression in the speech data, and the communication mark time is used to synchronize an animated expression with the communication expression in the speech data; and sending the speech data and the communication mark data to enable synchronization of the animated expression for the virtual object with the speech data using the expression tag in the communication mark data.

6. The method in claim 5, wherein analyzing the text data further comprises analyzing the speech data for a word, phrase, or pattern that is associated with the communication expression.

7. The method in claim 6, wherein analyzing the text data further comprises:

analyzing the text data to determine a predicted conversation flow path, wherein the text data is analyzed for a keyword or phrase that indicates the predicted conversation flow path;

identifying a predicted communication expression that is associated with the predicted conversation flow path; and generating the communication mark data to include a second expression tag that represents the predicted communication expression, wherein the second expression tag is provided to a simulation client ahead of a time that the predicted communication expression is simulated.

8. The method in claim 6, wherein analyzing the text data further comprises:

analyzing the text data using natural language analysis to identify the word, phrase, or pattern; and identifying the communication expression that is associated with the word, phrase, or pattern.

9. The method in claim 6, wherein analyzing the text data further comprises:

identifying a language context for the word, phrase, or pattern; and identifying the communication expression that is associated with the language context for the word, phrase, or pattern.

10. The method in claim 5, further comprising:

identifying an imminent change of communication expression in the speech data by analyzing the speech data for an indication of the imminent change of expression; and generating the communication mark data to include a second expression tag that represents the imminent change of expression, wherein the second expression tag allows for smoothing animation of the virtual object from a first animated expression to a second animated expression associated with the imminent change of expression.

11. The method in claim 5, wherein generating the communication mark data further comprises adding the expression tag to SSML (Speech Synthesis Markup Language) included in the communication mark data.

12. The method as claim 5, wherein the communication mark data further includes at least one of: a sentence element that indicates a sentence in the speech data, a word element that indicates a word in the speech data, and phonetic data indicating a face and mouth movement that corresponds to a phoneme in the speech data.

13. The method in claim 5, wherein the speech data for the virtual object further comprises:

receiving user video data streamed from a client;

analyzing the user video data to detect the communication expression; and generating the communication mark data to include the expression tag that represents the communication expression detected in the user video data.

14. The method in claim 5, further comprising:

retrieving a virtual object profile for the virtual object, wherein the virtual object profile includes attributes for the virtual object; and generating communication mark data to include expression tags that represent the attributes.

15. The method in claim 14, wherein the virtual object profile includes attributes comprising at least one of: a virtual object type, a persona, a lexicon, a language, or a personality type.

16. A non-transitory machine readable storage medium having instructions embodied thereon, the instructions when executed by a processor:

render a virtual object to simulate speech and associated communication expressions in a simulation environment generated using a simulation client;

receive a data stream that includes speech audio data and communication mark data for the virtual object, wherein the communication mark data includes expression tags that represent communication expressions identified in the speech audio data by converting the speech audio data to text data using speech recognition and detecting indicators of the communication expressions in the text data, and the expression tags are assigned communication mark times that correspond to occurrences of the communication expressions in the speech audio data;

identify expression animations that correspond to the expression tags in the communication mark data; and animate the virtual object using the expression animations and the communication mark times, wherein the communication mark times are used to synchronize animation of the expression animations with the speech audio data.

17. The non-transitory machine readable storage medium in claim 16, wherein the virtual object is further configured to represent a remote user who provides speech data using a second simulation client.

18. The non-transitory machine readable storage medium in claim 16, wherein the virtual object is configured to simulate human conversation and associated communication expressions in response to user interaction with the virtual object.

19. The non-transitory machine readable storage medium in claim 16, further comprising receiving a virtual object file from a data store service of a computing service environment wherein the virtual object file includes the expression animations used to animate the virtual object.

\* \* \* \* \*